(12) United States Patent
Sievi et al.

(10) Patent No.: US 12,378,270 B2
(45) Date of Patent: *Aug. 5, 2025

(54) PLATINUM COMPLEXES

(71) Applicant: Heraeus Deutschland GmbH & Co. KG, Hanau (DE)

(72) Inventors: Robert Sievi, Hanau (DE); Richard Walter, Hanau (DE); Holger Rauter, Hanau (DE); Michael Gock, Hanau (DE); Holger Ulland, Willich (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 670 days.

This patent is subject to a terminal disclaimer.

(21) Appl. No.: 17/754,001

(22) PCT Filed: Jul. 1, 2020

(86) PCT No.: PCT/EP2020/068465
§ 371 (c)(1),
(2) Date: Mar. 21, 2022

(87) PCT Pub. No.: WO2021/058154
PCT Pub. Date: Apr. 1, 2021

(65) Prior Publication Data
US 2022/0340610 A1    Oct. 27, 2022

(30) Foreign Application Priority Data
Sep. 25, 2019 (EP) .................... 19199475

(51) Int. Cl.
*C07F 15/00* (2006.01)
*C23C 18/08* (2006.01)

(52) U.S. Cl.
CPC .......... *C07F 15/0086* (2013.01); *C23C 18/08* (2013.01)

(58) Field of Classification Search
CPC .................................. C07F 15/0086
See application file for complete search history.

(56) References Cited

U.S. PATENT DOCUMENTS

| 5,695,815 | A | 12/1997 | Vaartstra | |
| 11,629,410 | B2* | 4/2023 | Sievi | C23C 18/08 |
| | | | | 427/383.7 |
| 11,806,142 | B2* | 11/2023 | Schibli | C23C 18/06 |
| 2023/0235185 | A1* | 7/2023 | Nikolaidis | C09D 7/63 |
| | | | | 106/1.05 |

FOREIGN PATENT DOCUMENTS

| WO | 90/07561 A1 | 7/1990 | |
| WO | WO-9007561 A * | 7/1990 | ........... B01D 53/944 |
| WO | 2014060864 A1 | 4/2014 | |
| WO | 2021089203 A1 | 5/2021 | |

OTHER PUBLICATIONS

W. Henderson, et al, 55 Acta Crystallographica Section C: Crystal Structure Communications 1408-1410 (1999) (Year: 1999).*
International Union of Pure and Applied Chemistry, Compendium of Chemical Terminology (IUPAC), Gold Book, p. 1024 (2014) (Year: 2014).*
CAS abstract RN 246854-72-8 (Year: 1999).*
CAS Abstract RN 131282-62-7 (Year: 1991).*
CAS abstract RN 131282-62-7 (1991) (Year: 1991).*

* cited by examiner

*Primary Examiner* — Alexander R Pagano
*Assistant Examiner* — Frank S. Hou
(74) *Attorney, Agent, or Firm* — Blank Rome LLP

(57) ABSTRACT

Platinum complex of the type $[L1L2Pt[O(CO)R1]X]_n$, wherein L1 and L2 are the same or different monoolefin ligands or together represent a compound L1L2 acting as a diolefin ligand, wherein X is selected from bromide, chloride, iodide, and —O(CO)R2, wherein —O(CO)R1 and —O(CO)R2 are the same or different C6-C18 or C8-C18 non-aromatic monocarboxylic acid groups with the exception of a phenylacetic acid group, or together represent a C8-C18 non-aromatic dicarboxylic acid group —O(CO)R1R2(CO)O—, wherein it is a mononuclear platinum complex where n=1, or wherein, in the event of the presence of L1L2 and/or of —O(CO)R1R2(CO)O—, it may be a polynuclear platinum complex with a whole number n>1.

4 Claims, No Drawings

PLATINUM COMPLEXES

The present invention relates to novel platinum complexes, methods for their production, and their use for producing platinum layers.

WO90/07561 A1 discloses platinum complexes of the formula LM[O(CO)R]2, wherein L represents a nitrogen-free cyclic polyolefin ligand, preferably cyclooctadiene (COD) or pentamethylcyclopentadiene, and M represents platinum or iridium, and wherein R represents benzyl, aryl, or alkyl having four or more carbon atoms, particularly preferably phenyl. The platinum complexes serve as fuel additives.

The object of the present invention was to find platinum compounds which can be used to produce platinum layers, in particular even on temperature-sensitive substrates.

The object can be achieved by providing platinum complexes of the type [L1L2Pt[O(CO)R1]X]$_n$, wherein L1 and L2 are the same or different monoolefin ligands or together represent a compound L1 acting as a diolefin ligand,
  wherein X is selected from bromide, chloride, iodide, and —O(CO)R2,
  wherein —O(CO)R1 and —O(CO)R2 represent the same or different C6-C18 or preferably C8-C18 non-aromatic monocarboxylic acid groups with the exception of a phenylacetic acid group, or together represent a C8-C18 non-aromatic dicarboxylic acid group —O(CO)R1R2(CO)O—,
  wherein they are mononuclear platinum complexes with n=1, or wherein, in the event of the presence of L1L2 and/or —O(CO)R1R2(CO)O—, they may be polynuclear platinum complexes with a whole number n>1.

According to the invention, platinum complexes of the type [L1L2Pt[O(CO)R1]X]$_n$ are preferably provided, wherein L1 and L2 together represent a compound L1L2 acting as a diolefin ligand, wherein X is selected from bromide, chloride, iodide, and —O(CO)R2,
  wherein —O(CO)R1 and —O(CO)R2 represent the same or different C6-C18 or preferably C8-18 non-aromatic monocarboxylic acid groups, respectively with the exception of a phenylacetic acid group, and wherein they are mononuclear platinum complexes with n=1, or polynuclear platinum complexes with a whole number n>1. Here, L1L2 represents a compound acting as a diolefin ligand.

In the event of polynuclear platinum complexes according to the invention, the number n generally represents a whole number, for example in the range from 2 to 5. In other words, whole number n>1 is generally in the range from 2 to 5; in particular, n is in this instance equal to 2 and the platinum complexes are dinuclear platinum complexes. In particular, the compound L1L2 or, respectively, the dicarboxylic acid group —O(CO)R1R2(CO)O— act as bridging ligands in the polynuclear platinum complexes according to the invention. X can also have a bridging effect.

The platinum is present in the +2 oxidation state in the platinum complexes.

In a first embodiment according to the invention of mononuclear platinum complexes of the type L1L2Pt[O(CO)R1]X, L1 and L2 are the same or different monoolefin ligands; X represents bromide, chloride, iodide, or —O(CO)R2; and —O(CO)R1 and —O(CO)R2 are the same or different non-aromatic C6-C18 or preferably C8-C18 monocarboxylic acid groups with the respective exception of a phenylacetic acid group.

In a second and simultaneously preferred embodiment according to the invention of mononuclear platinum complexes of the type L1L2Pt[O(CO)R1]X, L1 and L2 together are a compound L1L2 acting as a diolefin ligand at the same central platinum atom; X represents bromide, chloride, iodide, or —O(CO)R2; and —O(CO)R1 and —O(CO)R2 represent the same or different C6-C18 or preferably C8-C18 non-aromatic monocarboxylic acid groups, with the respective exception of a phenylacetic acid group.

In a third embodiment according to the invention of mononuclear platinum complexes of the type L1L2Pt[O(CO)R1]X, L1 and L2 are the same or different monoolefin ligands; X represents —O(CO)R2; —O(CO)R1 and —O(CO)R2 together represent a C8-C18 non-aromatic dicarboxylic acid group —O(CO)R1R2(CO)O— acting as a bidentate ligand at the same central platinum atom.

In a fourth embodiment according to the invention of mononuclear platinum complexes of the type L1L2Pt[O(CO)R1]X, L1 and L2 together are a compound L1L2 acting as a diolefin ligand at the same central platinum atom; X represents —O(CO)R2; and —O(CO)R1 and —O(CO)R2 together represent a C8-C18 non-aromatic dicarboxylic acid group —O(CO)R1R2(CO)O— acting as a bidentate ligand at the same central platinum atom.

In a first and simultaneously preferred embodiment according to the invention of bi- or polynuclear platinum complexes of the type [L1L2Pt[O(CO)R1]X]$_n$, L1 and L2 together represent a compound L1L2 bridging different platinum centers and acting as a diolefin ligand; X represents bromide, chloride, iodide or —O(CO)R2; n represents 2, 3, 4 or 5, preferably 2; and —O(CO)R1 and —O(CO)R2 are the same or different C6-C18 or preferably C8-C18 non-aromatic monocarboxylic acid groups, in each instance with the exception of a phenylacetic acid group.

In a second embodiment of bi- or polynuclear platinum complexes according to the invention of the type [L1L2Pt[O(CO)R1]X]$_n$, L1 and L2 together represent a compound L1L2 bridging different platinum centers and acting as a diolefin ligand; X represents —O(CO)R2; n represents 2, 3, 4, or 5, preferably 2; and —O(CO)R1 and —O(CO)R2 together represent a C8-C18 non-aromatic dicarboxylic acid group —O(CO)R1R2(CO)O— bridging different platinum centers.

In a third embodiment according to the invention of bi- or polynuclear platinum complexes of the type [L1L2Pt[O(CO)R1]X]$_n$, L1 and L2 represent the same or different monoolefin ligands; X represents —O(CO)R2; n represents 2, 3, 4, or 5, preferably 2; and —O(CO)R1 and —O(CO)R2 together represent a C8-C18 non-aromatic dicarboxylic acid group —O(CO)R1R2(CO)O— bridging different platinum centers.

The invention relates to said platinum complexes in individualized and also in combined form, i.e., alone or also as a mixture of a plurality of different species respectively of the type [L1L2Pt[O(CO)R1]X]$_n$.

L1 and L2 alone represent the same or different, preferably the same monoolefins, or together represent a polyolefinically unsaturated compound L1L2, for example a diolefin or a polyolefin, which can act as a diolefin ligand. The polyolefinically unsaturated compounds L1L2 which can act as diolefin ligands are thereby preferred.

Examples of monoolefins include C2-C18 hydrocarbons having a single olefinically unsaturated double bond. These may thereby be linear compounds, branched compounds, or compounds having cyclic structures. These are preferably pure hydrocarbons; however, the presence of heteroatoms, for example also in the form of functional groups, is also possible. Preferred examples of monoolefins include ethene, propene, and cyclohexene.

Examples of diolefins or, respectively, compounds of the type L1L2 that are capable of acting as diolefin ligands include hydrocarbons such as COD (1,5-cyclooctadiene), NBD (norbornadiene), COT (cyclooctatetraene), and 1,5-hexadiene, in particular COD and NBD. These are preferably pure hydrocarbons; however, the presence of heteroatoms, for example also in the form of functional groups, is also possible.

X can represent bromide, chloride, iodide, or —O(CO)R2; it preferably represents chloride or —O(CO)R2, in particular —O(CO)R2.

The respective non-aromatic monocarboxylic acid groups —O(CO)R1 and —O(CO)R2 alone represent the same or different C6-C18 or preferably C8-C18 non-aromatic monocarboxylic acid groups, respectively with the exception of a phenylacetic acid group. Together, they represent a C8-C18 non-aromatic dicarboxylic acid group of the type —O(CO)R1R2(CO)O—. The term "non-aromatic" used in this context excludes purely aromatic monocarboxylic acid and dicarboxylic acid groups but not araliphatic monocarboxylic acid and dicarboxylic acid groups whose carboxyl function(s) is/are bound to aliphatic carbon. —O(CO)R1 and also —O(CO)R2 do not under any circumstances represent a phenylacetic acid group. Preferably, —O(CO)R1 and —O(CO)R2 represent the same or different C6-C18 or C8-18 non-aromatic monocarboxylic acid groups with the respective exception of a phenylacetic acid group; in particular, —O(CO)R1 and —O(CO)R2 preferably represent the same C6-C18 or C8-C18 non-aromatic monocarboxylic acid groups, but under no circumstances phenylacetic acid groups.

Examples of C6-C18 non-aromatic or the preferred C8-C18 non-aromatic monocarboxylic acids having the —O(CO)R1 or, respectively, —O(CO)R2 groups include the isomeric hexanoic acids; the isomeric heptanoic acids; the isomeric octanoic acids, including n-octanoic acid and 2-ethylhexanoic acid; the isomeric nonanoic acids; and the isomeric decanoic acids, to name only a few examples. The respective R1 and R2 groups bound to a carboxyl group comprise 5 to 17 or, respectively, 7 to 17 carbon atoms; benzyl is thereby excluded.

Examples of C8-C18 non-aromatic dicarboxylic acids of the type HOOCR1R2COOH include correspondingly substituted malonic acids, correspondingly substituted 1,1-cyclobutane dicarboxylic acids, and cyclohexane dicarboxylic acids, to name only a few examples. The structural element —R1R2-bearing two carboxyl groups comprises 6 to 16 carbon atoms.

Preferred examples of platinum complexes according to the invention include $[(COD)Pt[O(CO)R1]_2]_n$ and $[(NBD)Pt[O(CO)R1]_2]_n$, wherein n is 1 or 2 and in particular 1, and wherein R1 stands for a C5-C17 or C7-C17 non-aromatic hydrocarbon group with the exception of benzyl.

The platinum complexes $[L1L2Pt[O(CO)R1]X]_n$ according to the invention can be easily prepared via ligand exchange, in particular without thereby using carboxylic acid salts of silver.

The production method includes mixing or, respectively, suspending or emulsifying a two-phase system. The one phase thereby comprises a reactant of the type $[L1L2PtX_2]_n$, with X selected from bromide, chloride, and iodide, preferably chloride, either as such or in the form of an at least substantially water-immiscible organic solution of such a reactant. Preferred reactants include $[L1L2PtCl_2]_n$ with n as a whole number from 1 to 5, in particular with n=1. Examples of suitable at least substantially water-immiscible organic solvents also include oxygen-containing solvents, for example corresponding water-immiscible ketones, esters, and ethers, in addition to aromatics and chlorinated hydrocarbons such as toluene, xylene, di-, tri-, and tetrachloromethane. By contrast, the other phase comprises an aqueous solution of alkali salt (in particular sodium or potassium salt) and/or of magnesium salt of a C6-C18- or, respectively, C8-C18 monocarboxylic acid of the type R1COOH, and optionally additionally of the type R2COOH, or corresponding alkali and/or magnesium salt of a C8-C18 dicarboxylic acid of the type HOOCR1R2COOH. The selection of the type of monocarboxylic acid salt(s) depends on the type of platinum complex according to the invention which is to be produced or the combination of platinum complexes according to the invention which are to be produced. The two phases are intensively mixed, for example by shaking and/or stirring, thereby forming a suspension or an emulsion. Mixing is performed for the purpose of maintaining the suspension- or emulsion state, for example for a duration of 0.5 to 24 hours, for example at a temperature in a range of 20 to 50° C. The ligand exchange thereby takes place, wherein the platinum complex or complexes formed according to the invention dissolves or dissolve in the organic phase, whereas the alkaliX salt or $MgX_2$ salt that is likewise formed dissolves in the aqueous phase. Upon completion of the suspension or emulsification, organic and aqueous phase are separated from one another. The platinum complex or complexes formed according to the invention can be obtained from the organic phase and, if necessary, subsequently purified by means of conventional methods.

For example, to mention only one specific example, $(COD)Pt[O(CO)CH(C_2H_5)C_4H_9]_2$ can be prepared by jointly emulsifying a solution of $(COD)PtCl_2$ in dichloromethane with an aqueous solution of sodium-2-ethylhexanoate. After completion of emulsification, the saline solution that is thereby formed by ligand exchange can be separated from the dichloromethane phase, and the $(COD)Pt[O(CO)CH(C_2H_5)C_4H_9]_2$ can be isolated from the latter and optionally purified via conventional purification methods. For example, the platinum complex $(COD)Pt[O(CO)CH(C_2H_5)C_4H_9]Cl$ can also be produced analogously if the stoichiometry is selected accordingly.

The platinum complexes according to the invention are readily soluble to infinitely soluble in conventional organic solvents. For example, they can be dissolved in aliphates, cycloaliphates, aromatics such as toluene or xylene, alcohols, ethers, glycol ethers, esters, and ketones to form real solutions, i.e., non-colloidal solutions.

An important property in addition to said solubility in conventional organic solvents is the comparatively low decomposition temperature of the platinum complexes according to the invention, for example, from as low as 150° C. to generally no higher than 200° C. This combination of features makes it possible to use the platinum complexes according to the invention for producing platinum layers on substrates. In the production of platinum layers, it is also advantageous by means of the platinum complexes according to the invention that no preparations containing colloidal platinum or nanoplatinum need to be used, so that any possible risks associated with them can be avoided.

For the purpose of generating a platinum layer, the organically dissolved platinum complexes according to the invention can be applied onto a substrate, for example directly as an organic solution, or the organic solution can be a component of a preparation having at least one further component. A coating comprising a platinum complex or platinum complexes according to the invention can first be dried and freed of organic solvent before it or the dried residue is subjected to decomposition via thermal treatment to form metallic platinum in the form of a layer. The thermal treatment comprises a heating to an object temperature above the decomposition temperature of the platinum complex according to the invention, or the combination of platinum complexes according to the invention. For this purpose, for example, heating is generally performed briefly to an object temperature above the aforementioned decomposition temperature range of 150° C. to 200° C., i.e., for example, correspondingly to >150° C. to >200° C., for example to 1000° C., for example in a furnace and/or via infrared irradiation. In general, an object temperature is selected to be slightly above the decomposition temperature. In general, the heating, more precisely stated the maintenance of the object temperature, does not require longer than 15 minutes.

The platinum layers thus obtainable are characterized by high metallic luster comparable to a mirror; the platinum layers are homogeneous in terms of a smooth, non-granular outer surface. The thickness of such platinum layers may, for example, be in the range from 50 nm to 5 µm, and the platinum layers may have a planar nature with or without desired discontinuities within the surface, or may have a desired pattern or design. The platinum layers may even be produced on temperature-sensitive substrates, i.e., for example, on substrates that are not temperature-stable above 200° C. For example, these may be temperature-sensitive polymer substrates, for example those based on polyolefin or polyester.

EXAMPLES

Example 1 (Production of (COD)Pt[O(CO)CH(C$_2$H$_5$)C$_4$H$_9$]$_2$ and Use for Production of a Platinum Layer)

A solution of 65 mmol (COD)PtCl$_2$ in 100 ml dichloromethane was stirred, and a solution of 260 mmol sodium-2-ethylhexanoate in 500 ml water was added. The two-phase mixture was emulsified for 24 h at 20° C. by vigorous stirring. The dichloromethane phase thereby turned yellow.

The dichloromethane phase was separated, and the solvent was distilled off. The viscous, yellow residue was absorbed into petroleum benzine (40-60), and the solution was dried with magnesium sulfate and filtered. The petroleum benzine was then completely distilled off. A viscous yellow residue of (COD)Pt[O(CO)CH(C$_2$H$_5$)C$_4$H$_9$]$_2$ remained. After 10 minutes of heating to 200° C., a specular, 0.5 µm thin layer of platinum could be obtained from a 20 µm-thick layer of the (COD) Pt[O(CO)CH(C$_2$H$_5$)C$_4$H$_9$]$_2$.

Example 2 (Production of (COD)Pt[O(CO)C$_6$H$_{11}$]$_2$)

Analogous to Example 1, 32.5 mmol (COD)PtCl$_2$ in 100 ml dichloromethane was reacted with 130 mmol sodium cyclohexanoate in 200 ml water.

Example 3 (Production of (COD)Pt[O(CO)C$_7$H$_{15}$]$_2$)

Analogous to Example 1, 32.5 mmol (COD)PtCl$_2$ in 100 ml dichloromethane was reacted with 130 mmol sodium n-octoate in 200 ml water.

Example 4 (Production of (COD)Pt[O(CO)C$_8$H$_{17}$]$_2$)

Analogous to Example 1, 130 mmol (COD)PtCl$_2$ in 200 ml dichloromethane was reacted with 520 mmol sodium isononanoate in 500 ml water.

Example 5 (Production of (COD)Pt[O(CO)(CH$_2$)$_5$C(CH$_3$)$_3$]$_2$)

Analogous to Example 1, 65 mmol (COD)PtCl$_2$ in 100 ml dichloromethane was reacted with 260 mmol sodium neodecanoate in 500 ml water.

Example 6 (Production of (NBD)Pt[O(CO)CH(C$_2$H$_5$)C$_4$H$_9$]$_2$)

Analogous to Example 1, 27.3 mmol (NBD)PtCl$_2$ in 100 ml dichloromethane was reacted with 110 mmol sodium-2-ethylhexanoate in 100 ml water.

The invention claimed is:

1. A platinum complex of the formula [(NBD)Pt[O(CO)R1]$_2$]$_n$, wherein
   n is 1 or 2, and
   R1 is a C$_5$-C$_{17}$ non-aromatic hydrocarbon group.

2. A method for producing a platinum complex according to claim 1, the method comprising emulsifying a two-phase system, wherein
   one phase comprises an at least substantially water-immiscible organic solution of a reactant of the formula [(NBD)PtX$_2$]$_n$, wherein X is selected from bromide, chloride, and iodide; and
   the other phase comprises an aqueous solution of an alkali and/or magnesium salt of a monocarboxylic acid of the formula R1COOH, wherein R1 is a C$_5$-C$_{17}$ non-aromatic hydrocarbon group.

3. The platinum complex of claim 1, wherein the platinum complex is:
   (NBD)Pt[O(CO)CH(C$_2$H$_5$)C$_4$H$_9$]$_2$.

4. The platinum complex of claim 1, wherein R1 is a C$_7$-C$_{17}$ non-aromatic hydrocarbon group.

* * * * *